United States Patent Office 3,323,221
Patented June 6, 1967

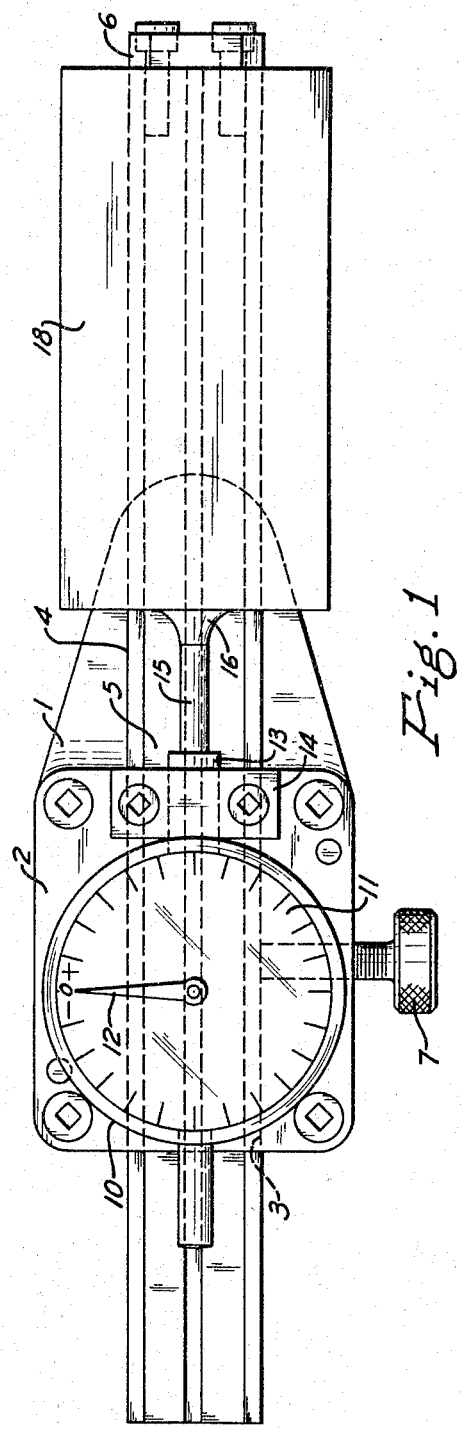
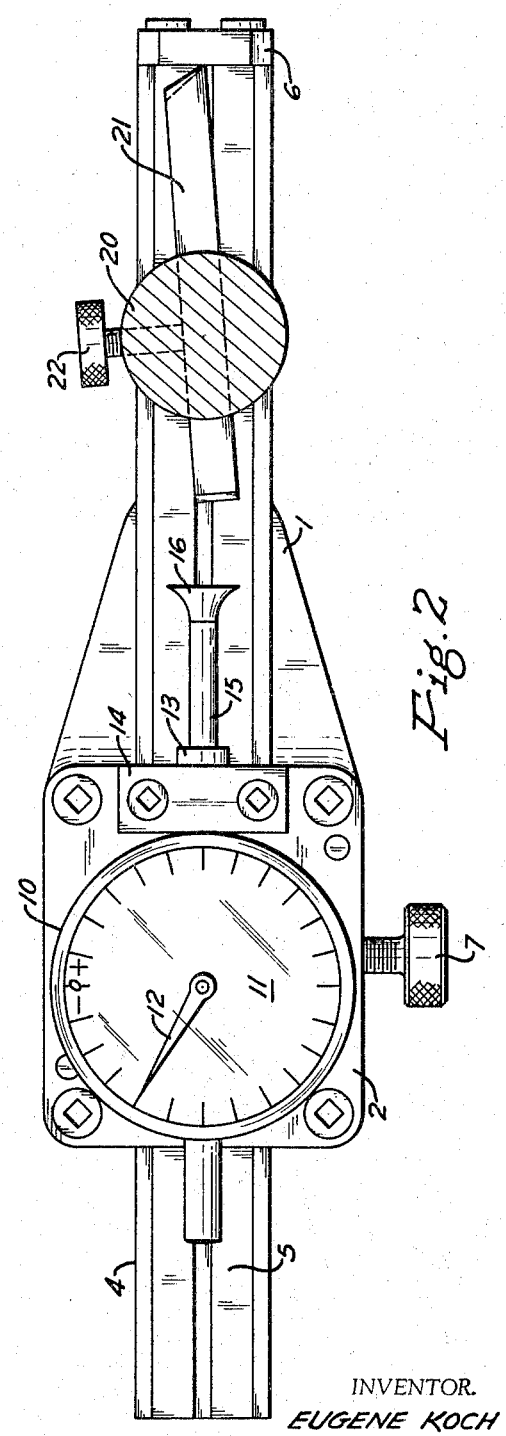

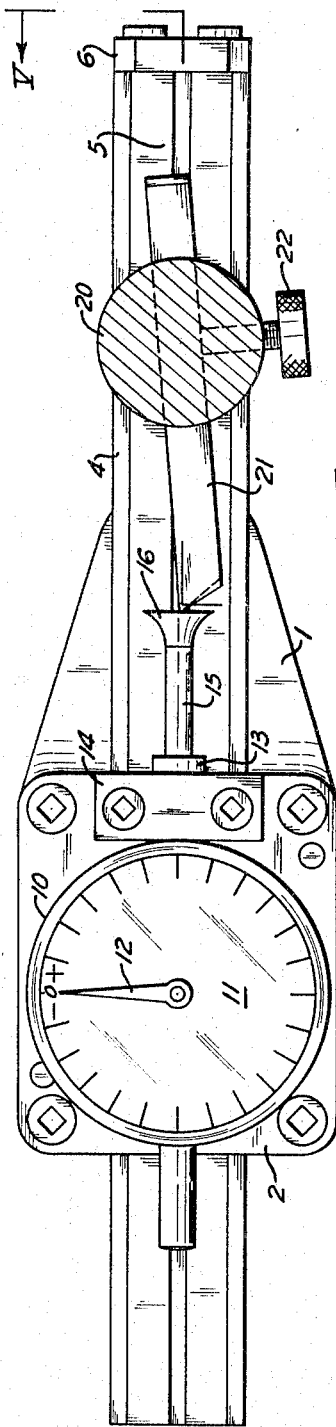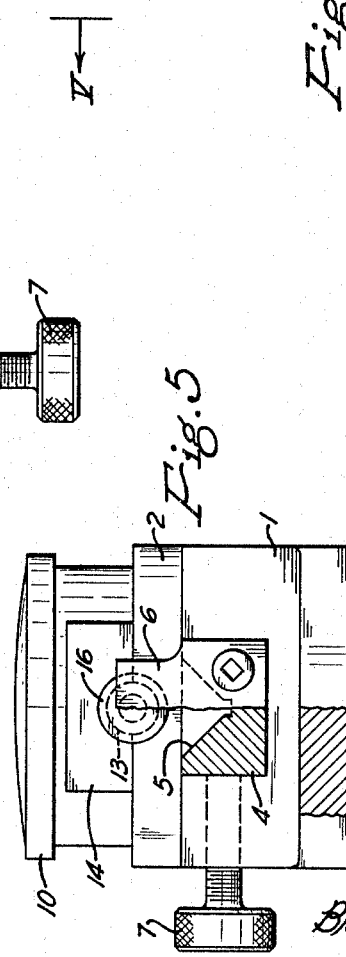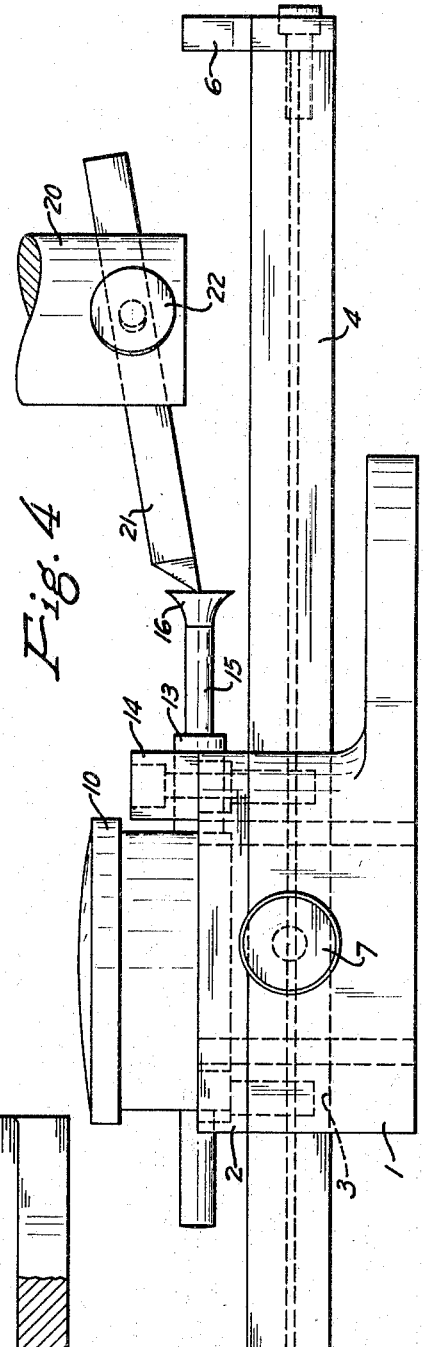

3,323,221
METHOD OF SETTING A BORING BAR, AND FIXTURE FOR DOING SO
Eugene Koch, Roseville, Mich., assignor to MS&R, Incorporated, Irwin, Pa., a corporation of Pennsylvania
Filed Feb. 11, 1965, Ser. No. 431,950
5 Claims. (Cl. 33—185)

This invention relates to gaging fixtures, and more particularly to the setting of a boring bar so that it will bore the correct diameter hole.

One way of making a hole in a body of metal is to bore it by means of a boring bar consisting of a rotatable vertical shaft, in the lower end of which a laterally projecting cutting tool is adjustably mounted. The distance that the cutter projects from the shaft determines the the diameter of the hole that can be bored. Where the diameter of the hole must be extremely accurate, it is necessary that the cutter project a precise distance from the shaft, but it is difficult to adjust the cutter so accurately by ordinary means of measuring.

It is among the objects of this invention to provide a method and fixture for setting a boring bar which will enable the bar to be set correctly in a quick and easy manner. Another object is to provide such a fixture which is simple and inexpensive in construction, and which is readily adjustable for setting a boring bar to bore any desired diameter hole or to cut a desired radius.

In accordance with this invention a longitudinally adjustable slide projects horizontally from a base and has a stop projecting upwardly from its outer end. Rigidly mounted on the base is a calibrated gage that has an actuating member above the slide spring-pressed toward the stop. The gage normally indicates a figure less than zero. The actuating member is movable away from the stop to actuate the gage. A gage block is selected which has a length equal to the diameter of the hole that is to be bored or twice the length of the radius of the arc that is to be cut. This block is inserted between the actuating member and stop and then the slide is adjusted relative to the base to cause the block to hold the actuating member in a position where it sets the gage at zero. The slide is locked in this position. Then the block is removed so that the actuating member will move out toward the stop. Thereafter, the fixture is placed on a support that extends beneath the boring bar, and the actuating member and stop are positioned at opposite sides of the vertical shaft of the bar. The stop is located close enough to the shaft so that it will be engaged by the outer end of the cutter when the shaft is turned. This causes the cutter to move the fixture radially of the shaft until the cutter passes the stop. By continuing to turn the shaft the cutter will engage the actuating member and push it away from the stop. At its maximum distance from the stop the actuating member will cause the gage to indicate whether or not the cutter projects the desired distance from the shaft. In other words, if the gage does not indicate zero at this time, the cutter is adjusted in the shaft to correct any variation from zero that the gage may have indicated. After a further check with the fixture, the boring bar is ready for use.

The preferred embodiment of the invention is illustrated in the accompanying drawings, in which FIG. 1 is a plan view of the fixture, with a gage block in place;
FIG. 2 is a plan view, with the block removed and the fixture positioned beneath a boring bar;
FIG. 3 is a plan view, with the boring bar rotated 180°;
FIG. 4 is a side view of FIG. 3; and
FIG. 5 is a combination end view and cross section, taken on the line V—V of FIG. 3.

Referring to FIGS. 1, 4 and 5 of the drawings, a relatively heavy base 1 has a horizontal channel extending lengthwise through it and covered by a plate 2 so that a passage 3 is formed through the base. Slidably mounted in this passage is a slide 4 that is provided with a longitudinal channel 5 having downwardly converging sides. One end of this slide, called the outer end, supports an upwardly projecting end plate 6 that forms a stop. This plate preferably is made from a machinable sintered carbide. The slide can be adjusted lengthwise of the base by means of a set screw 7 threaded in the side of the base and bearing against the side of the slide.

A calibrated gage is mounted on the base. The body 10 of the gage may be circular and it fits snugly in a circular opening in the cover 2 of the base. The gage includes a dial 11 that is calibrated to represent distances greater and less than zero. That is, the dial carries a zero mark and marks at both sides of it to indicate predetermined distances, such as thousandths of an inch. A needle 12 rotatably mounted in the center of the dial points to the calibrations. The needle can be swung in a well-known manner by an actuating member that is slidably mounted in the gage case and projects laterally from it through a sleeve 13 rigidly fastened to the case. The sleeve is clamped to the base by means of a clamping block 14 so that the gage is held firmly in place. The actuating member may be formed from a rod 15 extending out of the sleeve and along the slide toward stop 6. Mounted on the outer end of the rod is a feeler button 16. A suitable spring (not shown) in the gage normally holds the feeler button a predetermined distance away from clamping block 14 at a point where the needle points to a calibration an appreciable distance on the minus side of zero. Thus, if the feeler button is pushed toward the clamping block far enough, the needle will be swung toward and through zero and beyond to the plus side of zero.

This gage is used by first selecting a gage block 18 that has a length that is the same as the diameter of the hole that is to be bored. The gage block is inserted between the feeler button and the stop on the slide, and then the slide is adjusted forward or backward in the base sufficiently for the block to hold the button in a position where the needle will point directly to zero on the dial, as shown in FIG. 1. In other words, the gage block pushes the feeler button toward the dial. When the dial has been set at zero in this manner, the set screw is tightened to hold the slide in that position. The gage block now is removed and set aside, which permits the spring-pressed feeler button to move outward again to its original extended position.

The next step is to set the fixture on a support beneath the boring bar, as shown in FIG. 2, which consists of a rotatable vertical shaft 20 having an inclined passage in its lower end, from which a cutting tool 21 projects. The cutter is held in place by a set screw 22 in the shaft. The fixture is placed with its slide directly below the shaft and with the feeler button and stop on opposite sides of the shaft at approximately diametrically opposite points. Also, the fixture is positioned with its stop plate close enough to the shaft for the outer end of cutter 21 to engage the stop when the shaft is turned. Turning of the shaft by hand in the direction opposite to the cutting direction therefore will cause the cutter to push against the stop as the cutter slides across it, and this will cause the stop to pull the rest of the fixture in the direction of movement of the stop. As the shaft is rotated further, the outer end of the cutter leaves the stop and is swung around to engage the feeler button and push it away from the shaft, as shown in FIG. 3. If the boring bar has been set correctly, the button will be moved only far enough to swing the needle to the zero marking and no further. On the other hand, if the cutter does not project far enough from the shaft to bore a hole of the desired diameter, the needle will fall short of reaching zero. The point at which it stops will show how much the hole would be undersize, and therefore the gage will indicate twice the distance that the cutter should be pulled out of the shaft in order to cut correctly. If the cutter originally projects too far from the shaft, it will cause the feeler button to swing the needle past zero to a mark that will indicate twice the distance that the cutter should be pushed back into the shaft in order to bore a hole of the desired size. After the cutter has been adjusted one way or the other as required, it can be checked by the fixture again if desired and then, if found correct, the boring bar is ready to use. The gage may be calibrated to indicate variations of as little as ten-thousandths of an inch for very close tolerances.

The fixture disclosed herein also can be used in the same way for setting a boring bar to cut a radius in a side wall of a member, instead of a hole.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of setting a boring bar by means of a fixture having a horizontally adjustable stop spaced horizontally from a movable feeler member actuating a calibrated gage normally indicating a figure less than zero, the method comprising placing between said member and stop a gage block of a length equal to the diameter of the hole to be bored by said bar, adjusting the stop to cause the block to hold the feeler member in a position where it sets the gage at zero, removing the block to allow said member to move out toward the stop, placing the fixture on a support in a position where said member and stop will be located at diametrically opposite sides of a boring bar formed from a cutter projecting from the side of a rotatable vertical shaft, locating the stop in a position where it will be engaged by the outer end of the cutter when the shaft is turned, turning the shaft to cause the cutter to engage the stop to move said fixture radially of the shaft until the cutter passes the stop, continuing to turn the shaft until the cutter engages the feeler member and pushes it away from the stop as far as possible to operate the gage and thereby indicate whether or not the cutter projects the desired distance from the shaft, and then adjusting the cutter relative to the shaft to correct for any variation from zero that the gage may have indicated.

2. A fixture for setting a vertical boring bar, comprising a base having a flat bottom adapted to be slidably disposed on a support, a longitudinally adjustable slide supported by the base and projecting horizontally therefrom substantially midway between the opposite sides of the base, the slide having a stop projecting upwardly from its outer end and rigidly connected thereto, a calibrated gage rigidly mounted on the base and having an actuating member above the slide spring-pressed toward said stop, the space between said actuating member and stop being unobstructed, the gage normally indicating a figure less than zero, said member being movable away from said stop to operate the gage, and manually operable means for holding the slide in different longitudinally adjusted positions relative to the base to vary the distance between said stop and the adjacent end of the actuating member so that when a gage block of a length equal to the diameter of a hole to be bored is placed between said member and stop the slide can be adjusted to cause the block the actuating member in a position where it will set the gage at zero until the block is removed to make room for the lower end of a boring bar.

3. A fixture for setting a vertical boring bar, comprising a base having a flat bottom adapted to be slidably disposed on a support and provided with a central horizontal passage therethrough, a slide supported by the base and slidably mounted in said passage and having an end spaced outwardly therefrom, a stop projecting upwardly from said end and rigidly connected thereto, a calibrated gage rigidly mounted on the base and having an actuating member above the slide spring-pressed toward said stop, the space between said actuating member and stop being unobstructed, the gage normally indicating a figure less than zero, said member being movable away from said stop to operate the gage, and a set screw mounted in said base and engaging the slide to hold it in different longitudinally adjusted positions relative to the base to vary the distance between said stop and the adjacent end of the actuating member so that when a gage block of a length equal to the diameter of a hole to be bored is placed between said member and stop the slide can be adjusted to cause the block to hold the actuating member in a position where it will set the gage at zero until the block is removed to make room for the lower end of a boring bar.

4. A fixture for setting a vertical boring bar, comprising a base having a flat bottom adapted to be slidably disposed on a support and provided with a central horizontal passage therethrough, a slide supported by the base and slidably mounted in said passage and having an end spaced outwardly therefrom, a stop projecting upwardly from said end and rigidly connected thereto, a gage mounted on said base above said passage and having a needle rotatably mounted above a dial calibrated to represent distances greater and less than zero, the needle normally pointing to a calibration on the minus side of zero, the gage being provided with a needle-actuating member spring-pressed outwardly over said slide toward said stop and movable away from the stop to swing the needle toward and past zero on the dial, the space between said actuating member and stop being unobstructed, and manually operable means mounted in the base and engaging the slide to hold it in different longitudinally adjusted positions relative to the base to vary the distance between said stop and the adjacent end of the actuating member so that when a gage block of a length equal to the diameter of a hole to be bored is placed between said member and stop the slide can be adjusted to cause the block to hold the actuating member in a position where the needle will point to zero on the dial until the block is removed to make room for the lower end of a boring tool.

5. A fixture according to claim 4, in which said gage dial faces upwardly with its axis located above the longitudinal axis of said passage.

References Cited

UNITED STATES PATENTS

| | | | |
|---|---|---|---|
| 769,267 | 9/1904 | Muncaster | 33—147 |
| 1,478,954 | 12/1923 | Hardaker | 33—147 |
| 2,156,500 | 5/1939 | Jeschor | 33—185 |
| 2,775,821 | 1/1957 | Eipper et al. | 33—185 |
| 2,879,600 | 3/1959 | Sorensen | 33—147 |
| 2,916,829 | 12/1959 | Clay | 33—147 |

LEONARD FORMAN, *Primary Examiner.*

SAMUEL S. MATTHEWS, *Assistant Examiner.*